(12) United States Patent
Stegemeyer et al.

(10) Patent No.: US 11,248,855 B2
(45) Date of Patent: Feb. 15, 2022

(54) STRUCTURAL ELEMENTS, HOUSING STRUCTURE AND HEATING DEVICE

(71) Applicant: Robert Bosch GmbH, Stuttgart (DE)

(72) Inventors: Andreas Stegemeyer, Ludwigsburg (DE); Manfred Oehrlein, Schlierbach (DE); Marcus Wuenning, Shanghai (CN); Yildirim Cantuerk, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 286 days.

(21) Appl. No.: 15/958,083

(22) Filed: Apr. 20, 2018

(65) Prior Publication Data
US 2019/0162487 A1 May 30, 2019

(30) Foreign Application Priority Data

Nov. 30, 2017 (DE) .......................... 102017221507.0

(51) Int. Cl.
| | |
|---|---|
| *F28F 9/00* | (2006.01) |
| *F16M 1/00* | (2006.01) |
| *F24H 9/02* | (2006.01) |

(52) U.S. Cl.
CPC ............... *F28F 9/002* (2013.01); *F16M 1/00* (2013.01); *F24H 9/02* (2013.01)

(58) Field of Classification Search
CPC ..................................................... F28F 9/002
See application file for complete search history.

(56) References Cited

U.S. PATENT DOCUMENTS

| | | | | | |
|---|---|---|---|---|---|
| 4,640,437 | A | * | 2/1987 | Weingartner | B65D 90/06 217/131 |
| 5,020,481 | A | * | 6/1991 | Nelson | F24H 1/182 122/19.2 |
| 5,045,971 | A | * | 9/1991 | Ono | H04B 1/034 361/704 |
| 5,381,902 | A | | 1/1995 | Dumser et al. | |
| 5,924,392 | A | * | 7/1999 | Hall | F24H 1/182 122/494 |
| 6,126,002 | A | * | 10/2000 | Brown | B65D 19/14 206/320 |
| 6,267,261 | B1 | * | 7/2001 | Lesage | F24H 1/182 220/567.3 |

(Continued)

FOREIGN PATENT DOCUMENTS

| | | |
|---|---|---|
| FR | 2620803 A1 | 3/1989 |
| GB | 2483446 A | 3/2012 |

(Continued)

*Primary Examiner* — Nathaniel Herzfeld
(74) *Attorney, Agent, or Firm* — Norton Rose Fulbright US LLP; Gerard Messina

(57) ABSTRACT

A structural element for a housing structure of a heating device. The structural element is at least essentially, especially completely, developed as a foam part, preferably as a thermoplastic casting foam part. In addition, a housing structure is described, which has a corresponding structural element, preferably at least two corresponding structural elements. Moreover, a heating device is described that includes at least one corresponding structural element and/or a corresponding housing structure. In addition, a method for mounting a corresponding housing structure is described.

9 Claims, 20 Drawing Sheets

(56) References Cited

U.S. PATENT DOCUMENTS

| | | | | |
|---|---|---|---|---|
| 2007/0113800 A1* | 5/2007 | Foster | ............... | F24H 1/182 |
| | | | | 122/19.2 |
| 2008/0152331 A1* | 6/2008 | Ryks | ............... | F24H 1/08 |
| | | | | 392/490 |
| 2012/0192813 A1* | 8/2012 | Evans | ............... | F23N 5/00 |
| | | | | 122/20 B |
| 2012/0261102 A1* | 10/2012 | Hebert | ............... | F28D 15/00 |
| | | | | 165/129 |

FOREIGN PATENT DOCUMENTS

| | | |
|---|---|---|
| RU | 2208720 C2 | 7/2003 |
| RU | 2004126605 A | 4/2005 |
| RU | 2004136288 A | 7/2005 |
| RU | 70707 U1 | 2/2008 |
| RU | 140798 U1 | 5/2014 |
| RU | 171652 U1 | 6/2017 |
| WO | 2015079279 A1 | 6/2015 |

* cited by examiner

STRUCTURAL ELEMENTS, HOUSING STRUCTURE AND HEATING DEVICE

CROSS REFERENCE

The present application claims the benefit under 35 U.S.C. § 119 of German Patent Application No. DE 102017221507.0 filed on Nov. 30, 2017, which is expressly incorporated herein by reference in its entirety.

FIELD

The present invention relates to a structural element for a housing structure of a heating device, to a housing structure for a heating device, to a heating device, in particular a gas heating system, and to a method for mounting a housing structure for a heating device.

BACKGROUND INFORMATION

Conventionally, housings for heating devices are made up of a housing shell that is fixed in place on a wall mount. They are usually developed as one piece and consist predominantly of sheet metal.

SUMMARY

An example structural element for a housing structure of a heating device in accordance with the present invention may have an advantage that the structural element is at least essentially, and especially completely, developed as a foam part, preferably as a thermoplastic casting foam part. A housing structure is thereby able to be developed in multiple parts, and the development of the structural element as a foam part, preferably as a thermoplastic casting foam part, makes it possible to reduce the production cost.

Within the framework of the present invention, a structural element in particular describes a characteristic component of a housing structure of a heating device. The structural element preferably has a supporting function for at least one further component of the housing structure.

The features described herein allow for advantageous further developments of the present invention. For example, the structural element has at least one receptacle for at least one structural housing element, at least one further housing element, and/or at least one functional unit, as a result of which a flexible, multi-part design is achievable.

A structural housing element within the framework of the present invention in particular describes a component of a housing structure for a heating device.

The at least one structural housing element preferably is at least one connection element and/or at least one wind box, and thereby allows essential components of a housing structure to be mounted on the structural element. In this way the structural element may at least essentially also assume a supporting function for the at least one wind box of a heating device, which may possibly accommodate a heat cell.

The at least one further housing element is at least one component for connecting a hydraulic unit, at least one device for accommodating a control element, at least one detent element, and/or at least one outer wall of an external housing. In this way the structural element may at least essentially also assume a supporting function for further housing elements.

The at least one functional unit preferably is at least one manometer and/or at least one pressure-equalization vessel, so that also components that contribute to an operation of a heating device are able to be flexibly and easily mounted. Thus, the structural element may also at least essentially fulfill a supporting function for corresponding functional units.

The present invention also relates to a housing structure for a heating device. The housing structure has the advantage that it has at least one structural element, preferably at least two structural elements, as set forth in the preceding description.

A housing structure within the framework of the present invention particularly describes a basic development for a housing. More specifically, the housing structure is suitable for wall mounting. The housing structure preferably has fixedly mounted structural housing elements. For example, the structural housing elements may be mounted in a manner that does not allow an exchange. Therefore, there is no need to make provisions for an exchangeability of the structural housing elements of the housing structure using replacement parts.

The housing structure preferably includes at least one connection element, in particular a pipe element and/or a sheet-metal element, which is provided to connect the at least one structural element to a further structural element, and preferably the at least two structural elements to each other, which makes it possible to increase the stability of the housing structure.

The housing structure most preferably includes at least one wind box, which is able to accommodate a heat cell and thus allows for the secure introduction of a heat cell.

It is particularly advantageous if the housing structure is made up of the at least one structural element, and particularly of the at least two structural elements, as well as the at least one connection element and the at least one wind box, so that an especially stable and cost-effective design of the housing structure is possible.

The present invention also relates to a heating device, in particular a gas heating device. The heating device offers the advantage of having at least one structural element and/or a housing structure as described above, which allows for a particularly stable and economical design of the heating device and for the uncomplicated installation of different housing elements and/or functional elements of the heating device.

In addition, the present invention also relates to a method for installing a housing structure for a heating device, in particular a housing structure as set forth in the preceding description. The method has the advantage that at least the following method steps are carried out:

a) Introducing, preferably inserting, at least one connection element into at least one structural element, in particular into the at least two structural elements, in order to connect the at least one structural element to a further structural element, and especially the at least two structural elements to each other;

b) Mounting, preferably attaching, at least one wind box on or to the at least one structural element, in particular the at least two structural elements.

A particularly rapid and efficient installation is possible as a result of the present method.

BRIEF DESCRIPTION OF THE DRAWINGS

Exemplary embodiments of the present invention are schematically illustrated in the figures and described in greater detail below.

DETAILED DESCRIPTION OF EXAMPLE EMBODIMENTS

Figure 1:
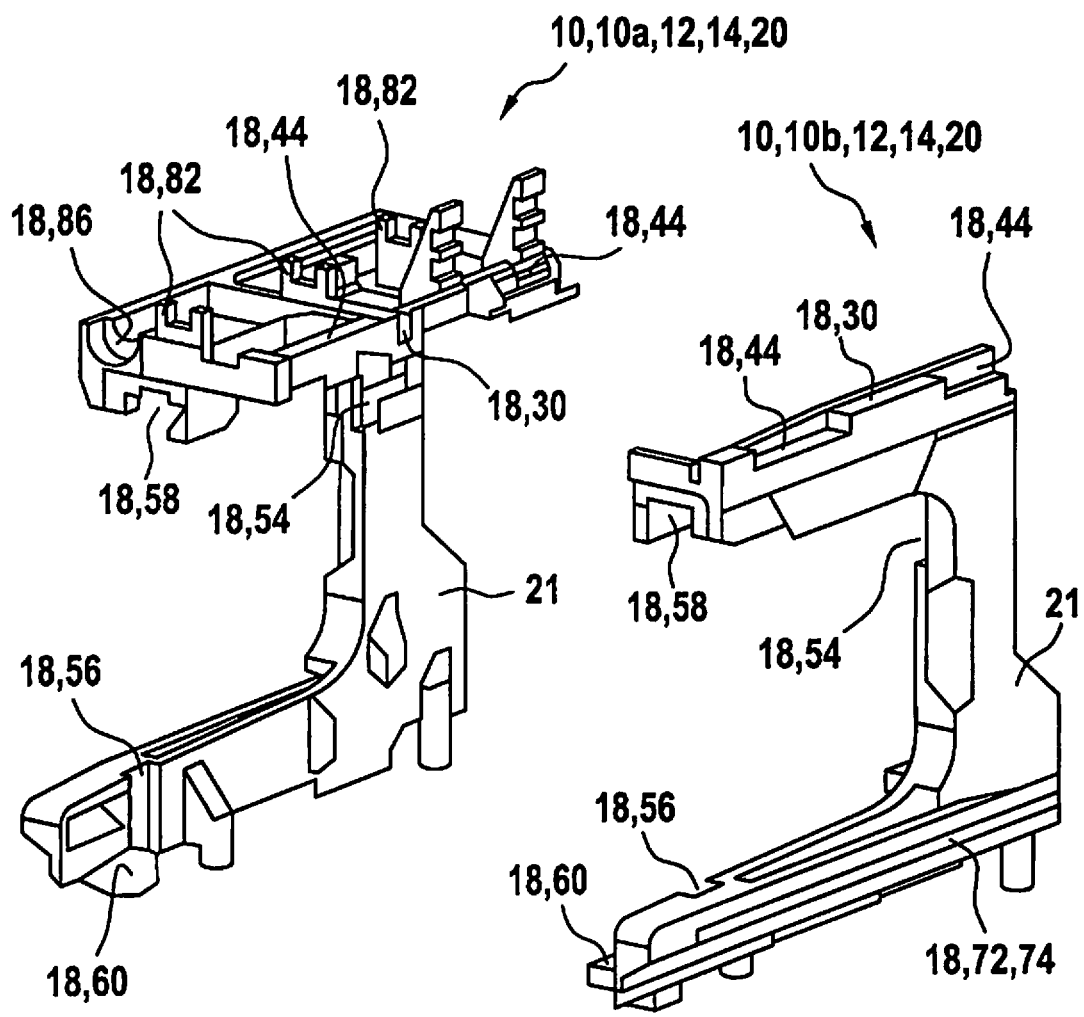
FIG. 1 shows a schematic representation of an exemplary embodiment of two structural elements for a housing structure.

Below, components that have the same or a similar design, in particular components that have the same function, have been identified by the same reference numerals.

FIG. 1 shows a schematic illustration of an exemplary embodiment of two structural elements 10 for a housing structure. Structural elements 10 are a structural element 10a and a further structural element 10b. A characteristic feature of structural elements 10 for a housing structure 16 of a heating device is that they are at least essentially, and in the illustrated exemplary embodiment completely, developed as foam parts 12. In the illustrated case, structural elements 10 are developed as thermoplastic foam cast parts 14, which reduces the production costs.

Structural elements 10 are developed in a C-shape in the illustrated case. Accordingly, in a lower region, the structural elements form a housing structure 16 that is open toward the front, which in turn provides maximum accessibility for a service technician during service or repair work on a heating device.

Structural elements 10 represent characteristic components of housing structure 16 of a heating device. They have a supporting function for additional components of housing structure 16 of a heating device.

Structural elements 10 include a multitude of receptacles 18 for structural housing elements 20, additional housing elements 22, and functional units 24, so that structural elements 10 are able to be expanded in a flexible manner.

Within the framework of the present invention, structural housing elements 20 are components of housing structure 16. In the illustrated exemplary embodiments, these are structural elements 10 themselves, a connection element 26, and a wind box 34, which form housing structure 16.

Figure 2:
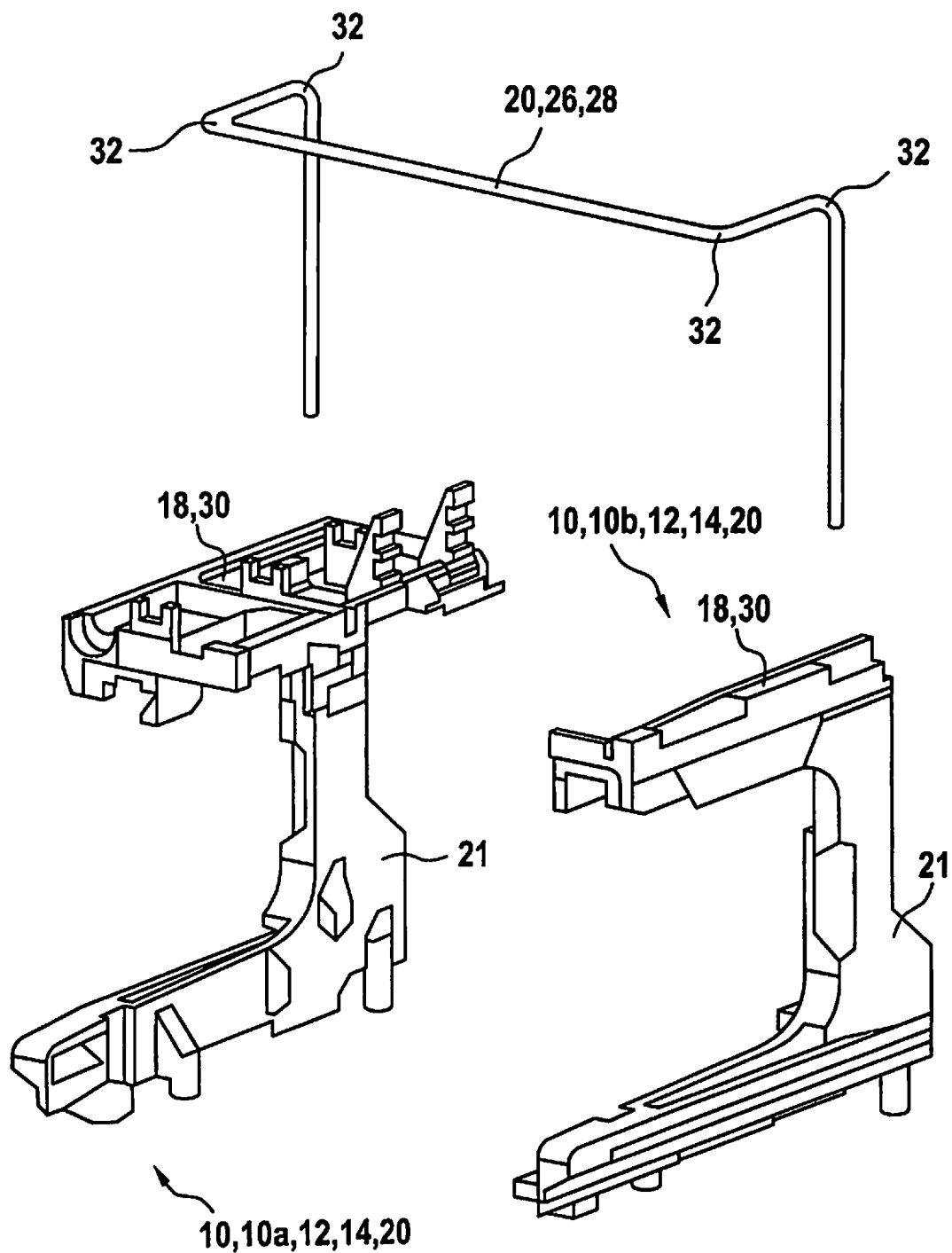
FIG. 2 shows a schematic representation of the exemplary embodiment of the structural elements from FIG. 1 together with a connection element.
Figure 3:
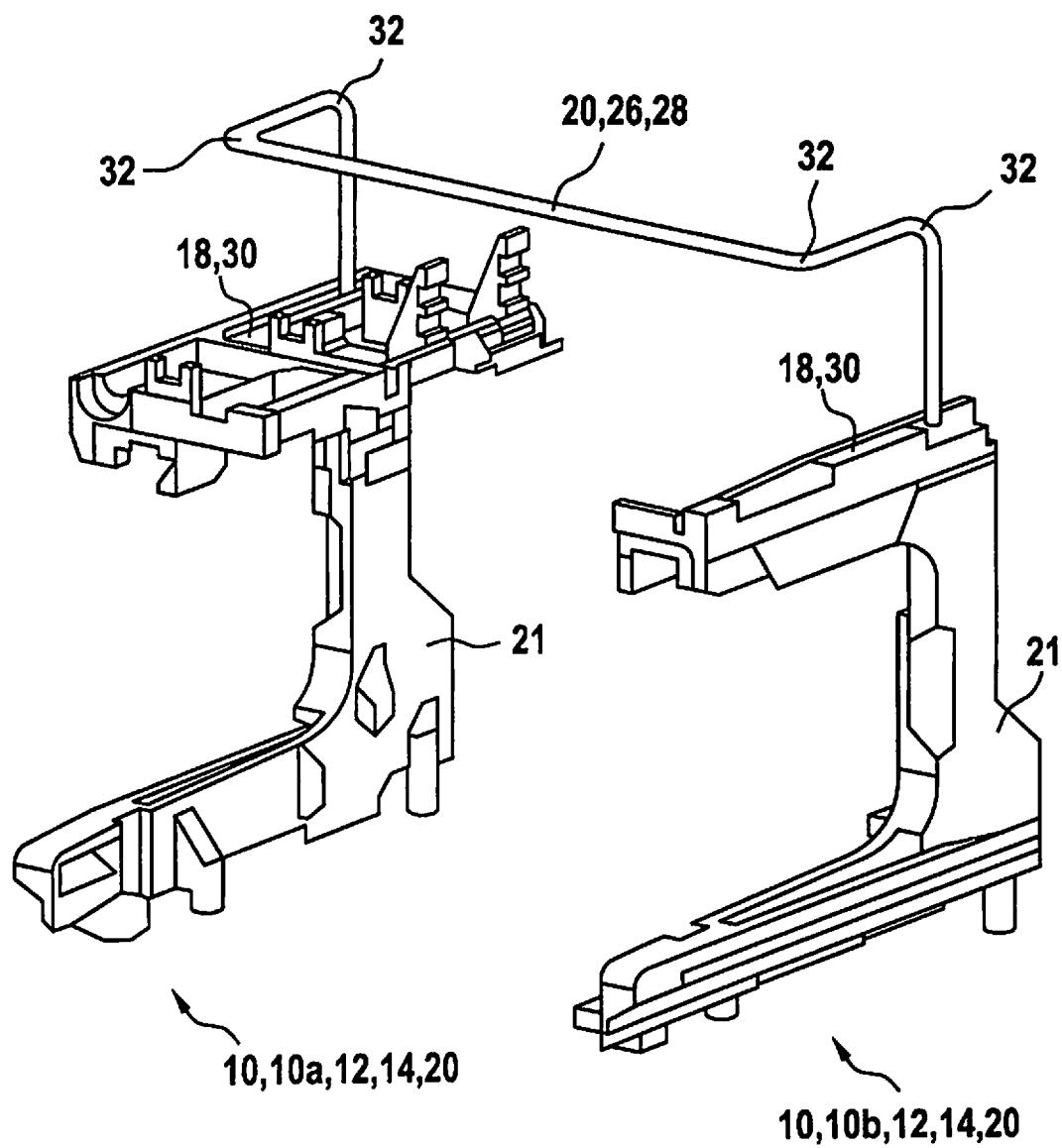
FIG. 3 shows a further schematic representation of the exemplary embodiment of the structural elements from FIG. 1 together with a connection element.
Figure 4:
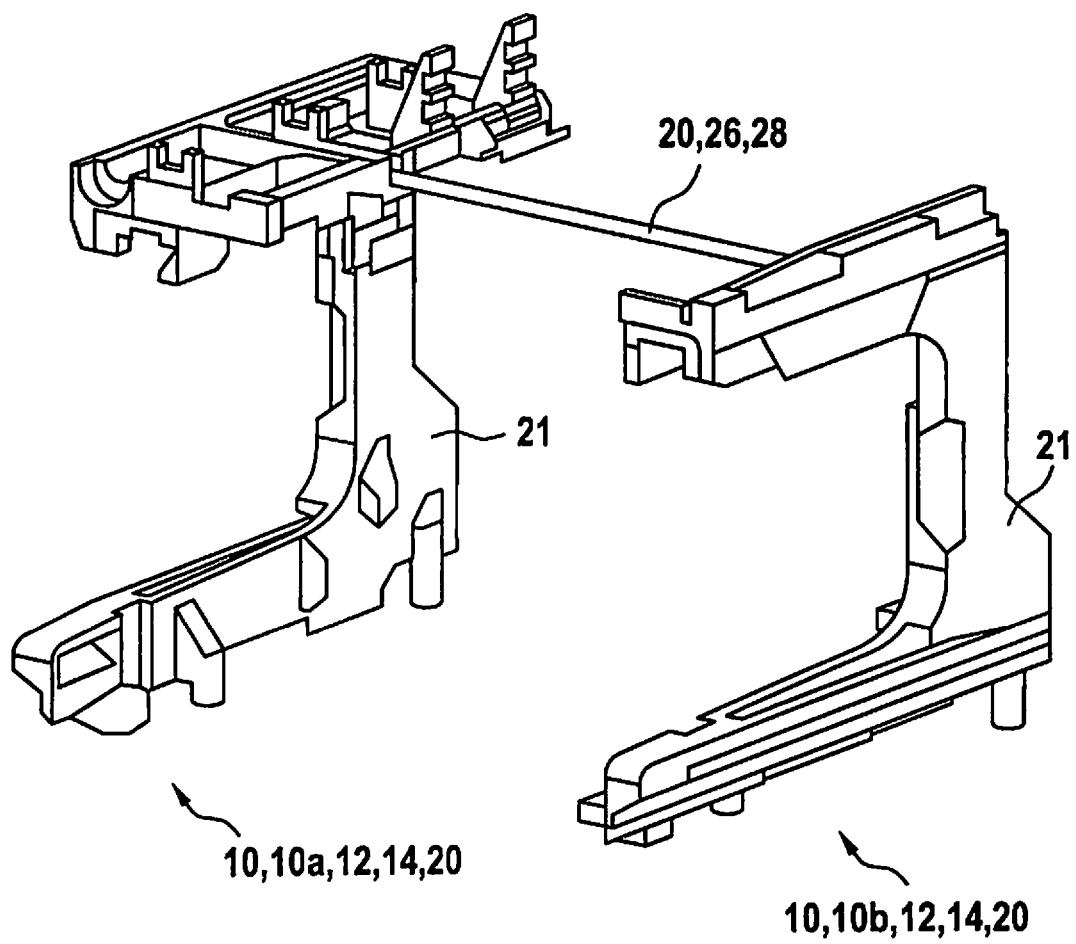
FIG. 4 shows a further schematic representation of the exemplary embodiment of the structural elements from FIG. 1 together with a connection element.

FIGS. 2 through 4 accordingly show schematic illustrations of the exemplary embodiment of structural elements 10 from FIG. 1 together with connection element 26. In the illustrated exemplary embodiment, connection element 26 is a pipe element 28. Pipe element 28 is made of metal in the illustrated case. In addition, pipe element 287 is developed in the form of a bracket in the case depicted, which results in a particularly high stability.

As can be gathered from FIGS. 2 through 4, connection element 26, or pipe element 28, is introduced into recesses 30 provided to accommodate connection element 26, said recesses having been introduced into structural elements 10. This connects structural elements 10, i.e. structural element 10a and additional structural element 10b, to each other.

Pipe element 28 has bent regions 32. Recesses 30 provided to accommodate pipe element 28 are developed in such a way that connection element 26 or pipe element 28 is able to be inserted into structural element 10 with a precise fit. Structural elements 10 are thereby connected to each other in a more stable manner and are no longer able to twist relative to each other.

Figure 5:
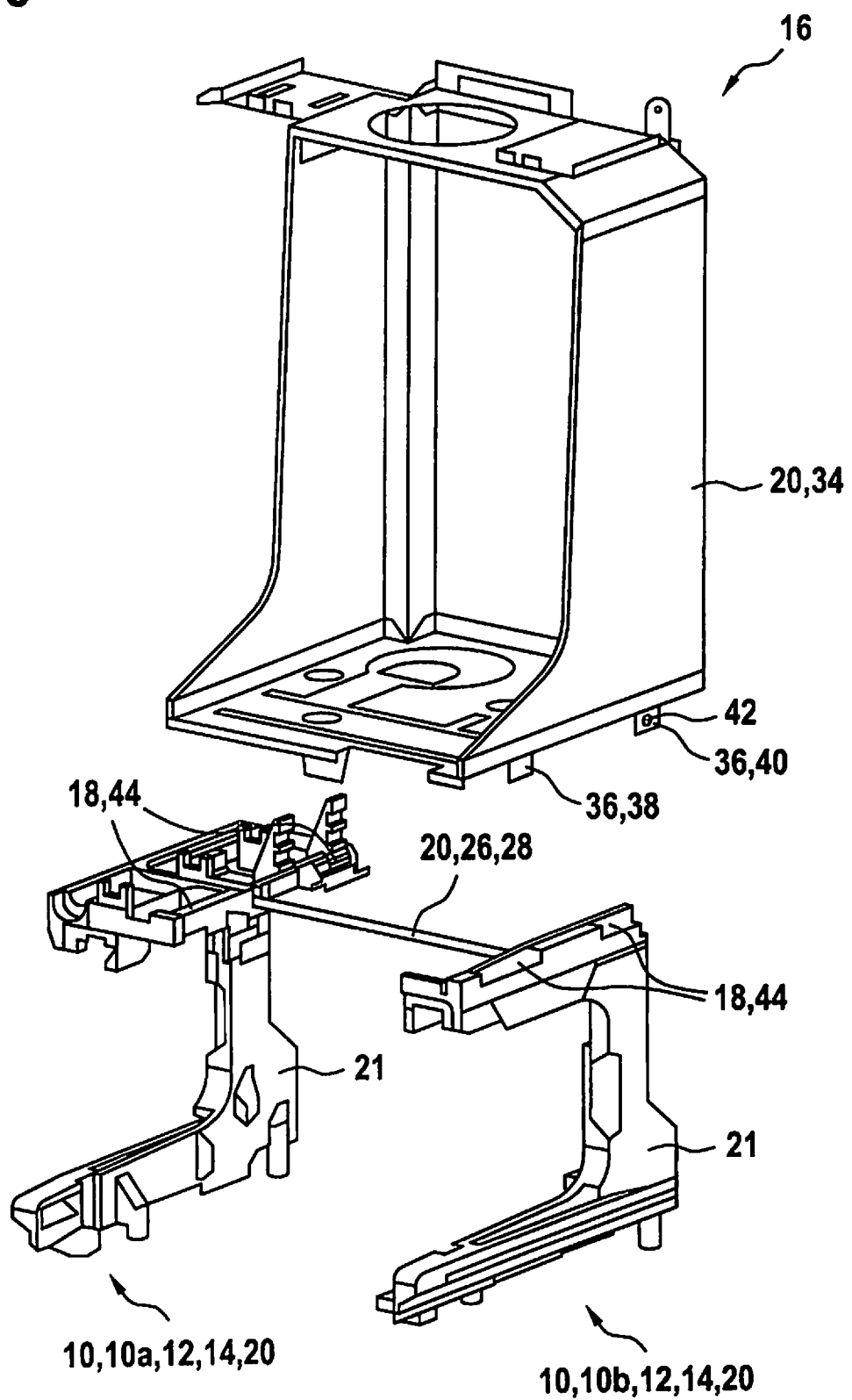
FIG. 5 shows a schematic representation of the exemplary embodiment of the structural elements from FIG. 1 together with a connection element and a wind box.
Figure 6:
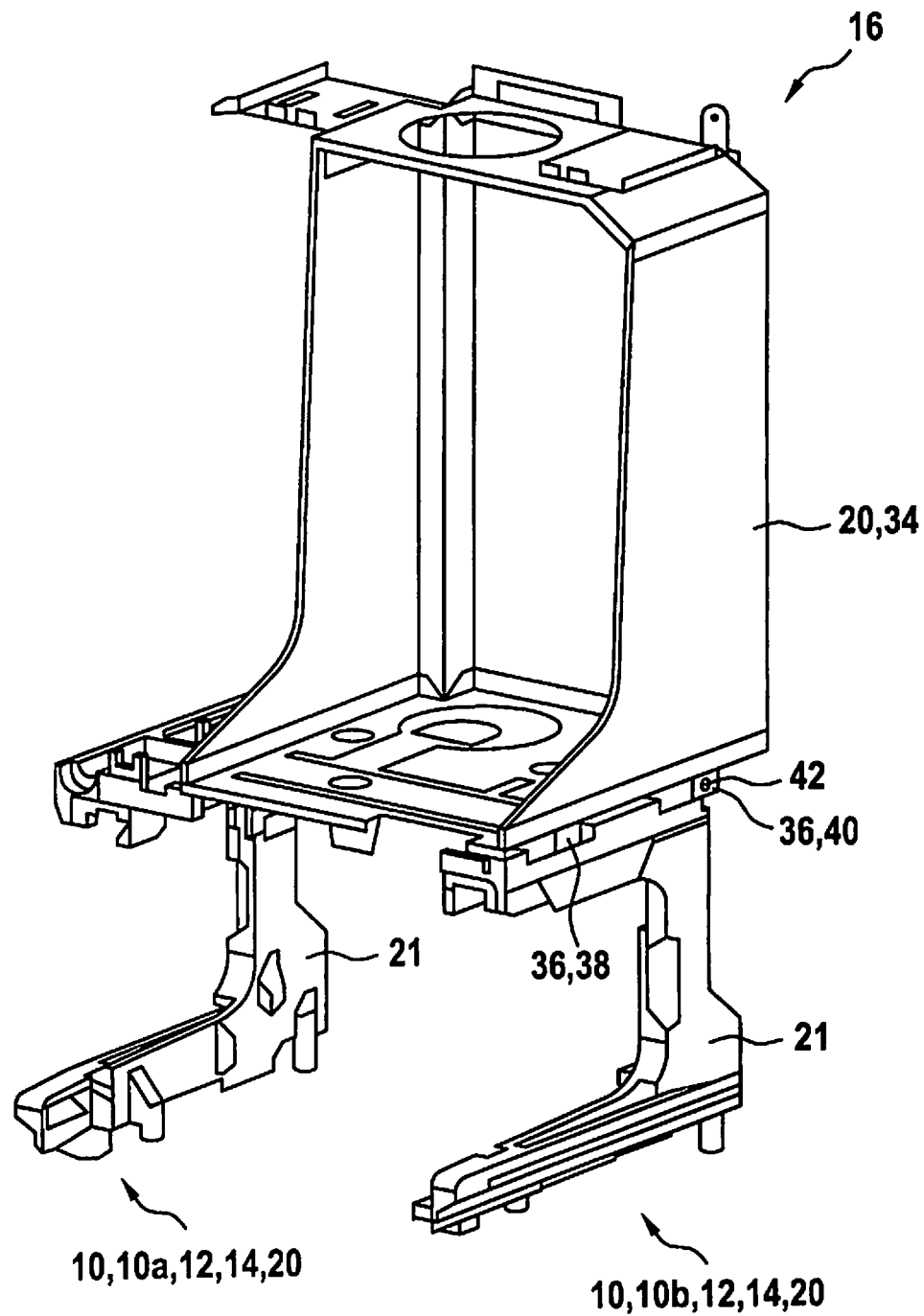
FIG. 6 shows a further schematic representation of the exemplary embodiment of the structural elements from FIG. 1 together with a connection element and a wind box.
Figure 7:
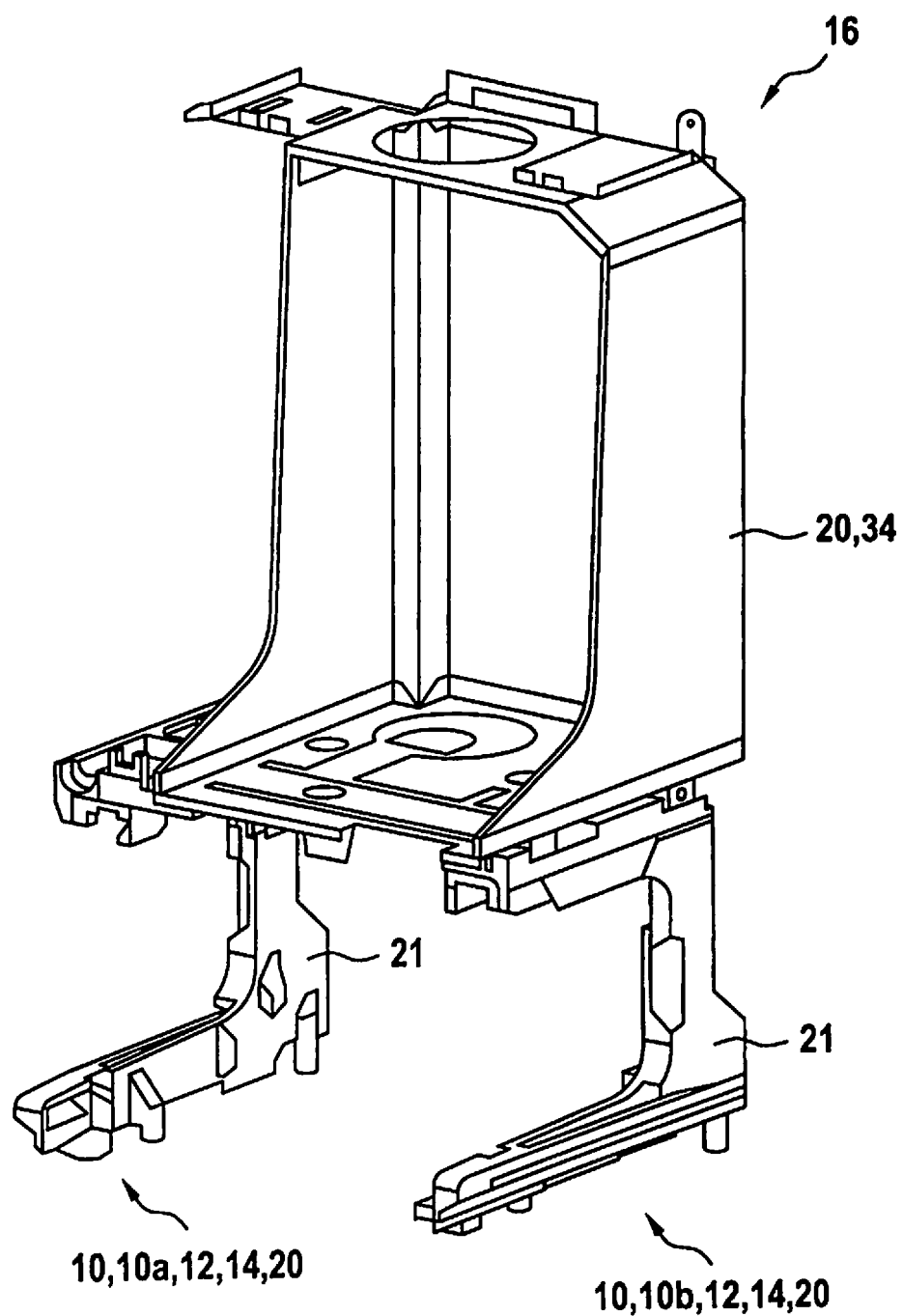
FIG. 7 shows a further schematic representation of the exemplary embodiment of the structural elements from FIG. 1 together with a connection element and a wind box.

FIGS. 5 through 7 show a schematic illustration of the exemplary embodiment of structural elements 10 from FIG. 1 together with a connection element 20 and a wind box 34. Wind box 34 is mounted on structural elements 10, which are connected with the aid of connection element 26.

Wind box 34 has two tab-like connection means 36 on both sides, i.e., a frontal, tab-like connection means 38, and a rear, tab-like connection means 40 in the illustrated case. Tab-like connection means 36 are meant to establish a form-locked connection with structural elements 10.

Frontal, tab-like connection means 38 has an uninterrupted planar form while rear, tab-like connection means 40 has a hole 42. Hole 42 is provided to allow for an affixation, e.g., by a detent connection, with the aid of a snap-in hook.

As already mentioned, according to the exemplary embodiment shown in FIGS. 5 through 7, wind box 34 is installed on structural elements 10. Tab-like connection means 38 are inserted into corresponding recesses 18, in the illustrated case into recesses 44 provided for the accommodation of tab-like connection means 38.

After tab-like connection means 36 have been introduced in recesses 44 provided to accommodate tab-like connection means 38, wind box 34 is fixed in place with structural elements 10 through a lateral displacement, i.e. a displacement towards the front in the illustrated case. In the process, rear, tab-like connection means 40 is fixed in place in such a way that no further displacement is possible. The fixation is accomplished with the aid of a detent element, which is a snap-in hook in the illustrated case and which snaps into place in hole 42 of rear, tab-like connection means 40, so that a further displacement of wind box 34 toward the rear is prevented.

It would alternatively also be conceivable to develop tab-like connection means 36 and/or recesses 44 provided to accommodate tab-like connection means 36 in such a way that the fixation takes place by a displacement toward the rear. In this case, it would also be conceivable to accomplish a fixation, exclusively or in addition to the lateral displacement, with the aid of a screw connection or a rivet connection.

FIGS. 1 through 7 accordingly represent a mounting sequence for a method for mounting a housing structure 16 for a heating device. The main characteristic of the present method is that the following method steps are carried out:
a) Inserting connection element 26, i.e. pipe element 28 in the illustrated case, into structural elements 10 in order to connect structural elements 10 to each other;
b) Placing wind box 34 on top of structural elements 10.

This allows for a particularly rapid and simple mounting.

In addition, the housing structure has a wall mount on the rear side of wind box 34, which is not shown in greater detail here. The wall mount is provided to allow the housing structure to be mounted on a wall, e.g., using a screw fastening. Structural elements 10 once again have supporting geometries 21, which are provided in order to brace housing structure 16 on a wall in a lower region.

As previously mentioned, structural elements 10 are also able to be flexibly expanded by further housing elements 22 with the aid of the multitude of receptacles 18. Accordingly, FIGS. 8 through 11 show schematic representations of structural elements, or schematic representations of parts of structural elements 10, together with further housing elements 22.

In the illustrated cases, further housing elements 22 are components 46 for connecting a hydraulic unit, a device 48 to accommodate a control element 50, a detent element 52, a further detent element 58, and outer walls 53 of an external housing.

Figure 8:
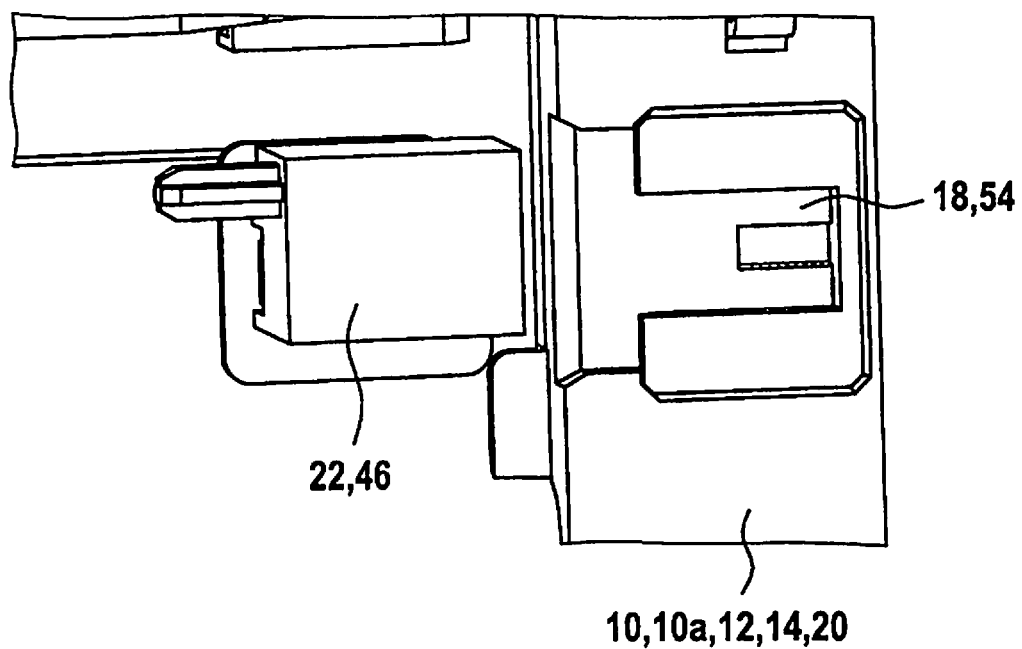
FIG. 8 shows a schematic representation of a part of the exemplary embodiment of the structural elements from FIG. 1 together with a component for connecting a hydraulic unit.

FIG. 8 shows a schematic representation of one part of the exemplary embodiment of structural element 10*a* from FIG. 1 with a component 46 for connecting a hydraulic unit. Component 46 for connecting a hydraulic unit is inserted into a recess 54 provided to accommodate said component 46. Analogous thereto, a further component 46 is mounted on further structural element 10*b* in order to connect a same hydraulic unit. Accordingly, components 46 for connecting such a hydraulic unit are provided for mounting the hydraulic unit on structural elements 10 or on housing structure 16. In this way, structural elements 10 or housing structure 16 carry out a supporting function for such a hydraulic unit.

Figure 9:
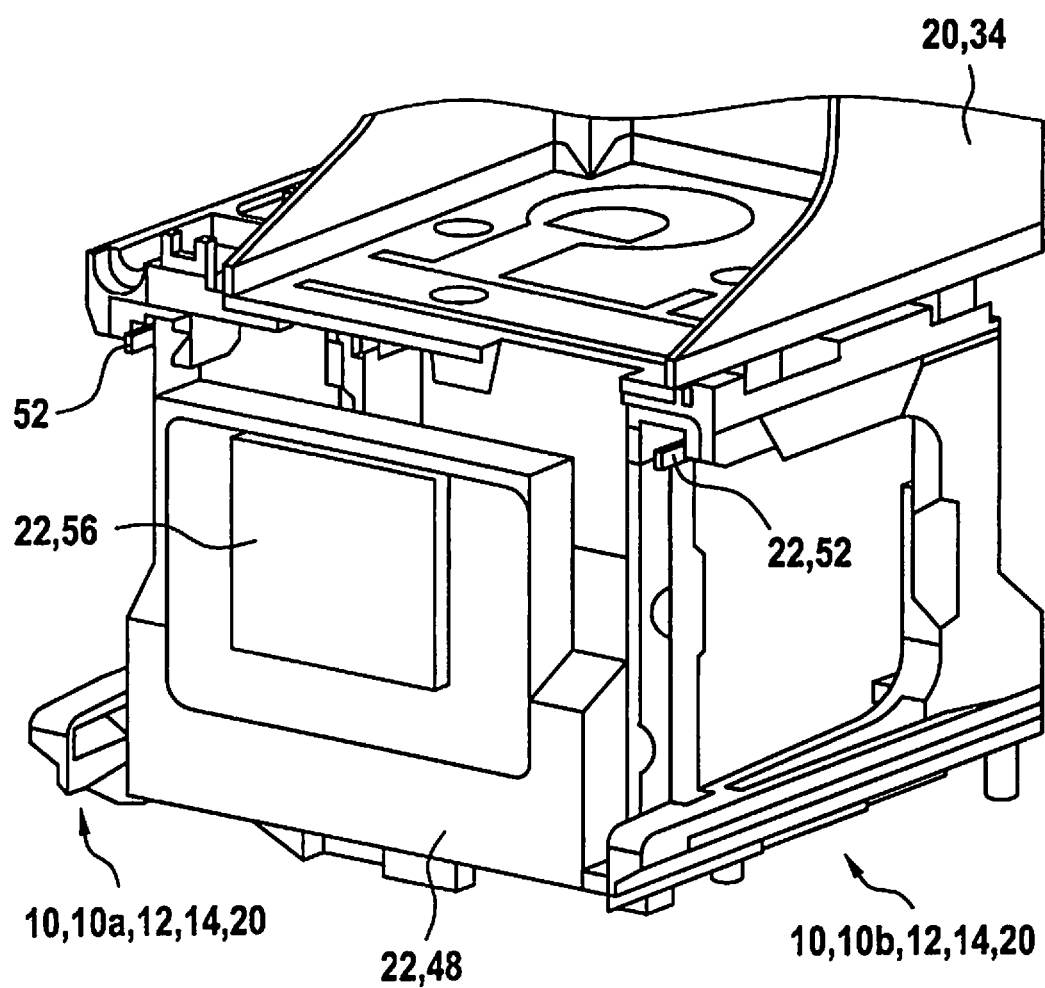
FIG. 9 shows a schematic representation of the exemplary embodiment of the structural elements from FIG. 1 together with a device for accommodating a control element and detent elements.

FIG. 9 shows a schematic representation of the exemplary embodiment of the structural elements from FIG. 1 together with a device 48 for accommodating control element 50. Device 48 for accommodating control element 50 is introduced into recesses 56 that are provided to accommodate this device and are mounted accordingly on structural elements 10.

In addition, FIG. 9 shows that detent elements 52 are able to be introduced into structural elements 10. Illustrated detent elements 52 are provided to secure device 48 for the accommodation of control element 50 on structural elements 10. Detent elements 52 themselves are attached to device 48 for accommodating control element 50 and may be plugged into recesses 58 provided to accommodate said detent elements 52. This allows for a particularly easy mounting of device 48 for the accommodation of control element 50.

Figure 10:
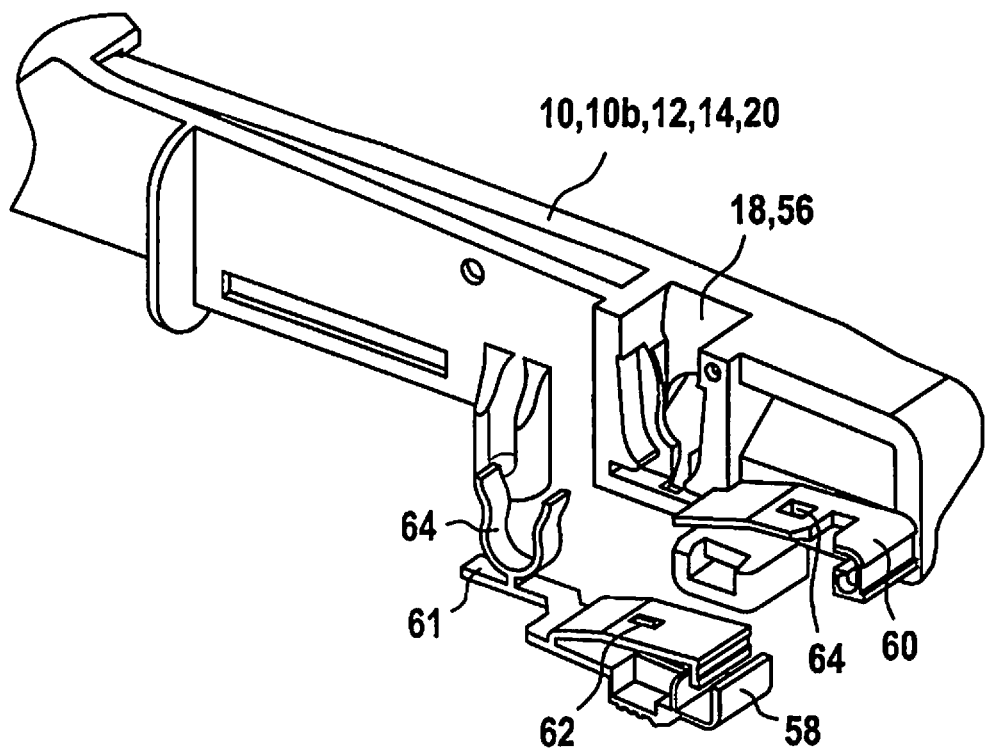
FIG. 10 shows a schematic representation of a part of the exemplary embodiment of a structural element from FIG. 1 together with a further detent element.

FIG. 10 shows a schematic representation of one part of the exemplary embodiment of further structural element 10*b* from FIG. 1 together with a further detent element 58. Further detent element 58 is introduced into a receptacle 60 that corresponds to said further detent element 58. Analogous thereto, on the opposite side, a further detent element 58 of an identical design, or alternatively also of a similar design, possibly a mirrored detent element 58, is introduced on structural element 10*a* into a receptacle 60 that corresponds to said identically or similarly designed further detent element 58. In the illustrated case, further detent elements 58 are provided for the purpose of securing a front cover on the underside of housing structure 16 with the aid of a latching mechanism.

Further detent elements 58 themselves are introduced into receptacles 60 and are likewise held in place by a latching mechanism. Accordingly, further detent elements 58 have a projection 62 in each case while receptacles 60, which correspond to further detent element 58, have openings 64 for projections 62 to engage with.

In addition, FIG. 10 shows recesses 56 that are provided to accommodate device 48. Moreover, it can be gathered that further detent element 58 has an extension 61 having a clamp-like structure 64. When inserting further detent element 58, clamp-like structure 64 is simultaneously introduced into recess 56 provided for the accommodation of device 48, via extension 61. There, clamp-like structure 64 forms a receptacle 65 for a thrust bearing and/or a rotational bearing of device 48. In this way, at least a part of device 48 for the accommodation of control element 50 is able to be rotatably mounted, which allows device 48 with control element 50 to be flipped open.

Figure 11:
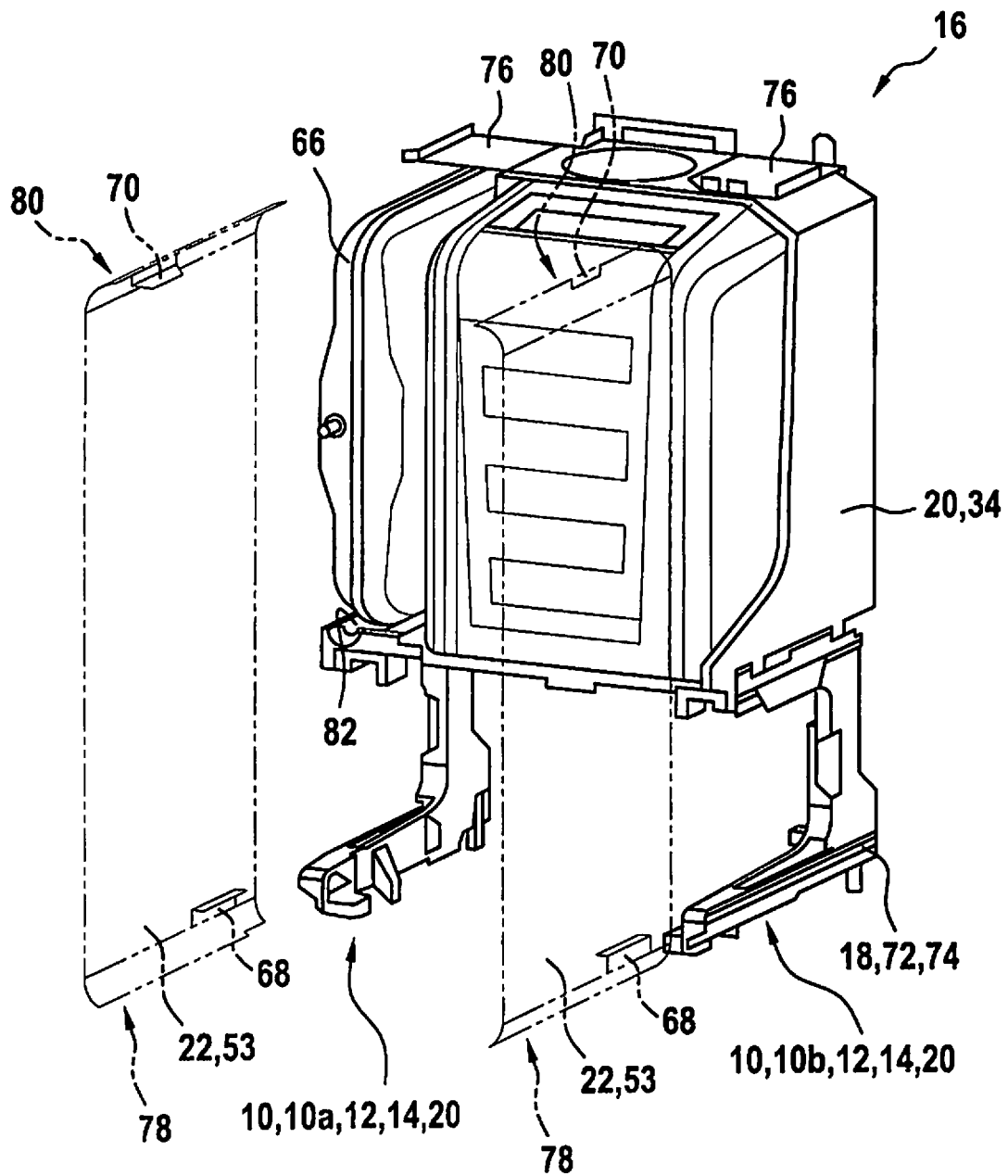
FIG. 11 shows a schematic representation of the exemplary embodiment of the device structure from FIG. 6 with a closed wind box, a pressure-equalization vessel, and outer walls.

FIG. 11 shows a schematic illustration of the exemplary embodiment of device structure 16 from FIG. 6 together with a wind box 34, which is shown in the closed state in the illustrated case; also shown are a pressure-equalization vessel 66 and outer walls 53 of an external housing. Each outer wall 53 has a lower guide element 68 and an upper guide element 70. When outer walls 53 are installed on device structure 16, guide elements 68, 70 are disposed on a side of outer walls 53 that faces device structure 16. Lower guide elements 68 are developed in the form of hook-type sheet-metal parts 69, which have a U-form in the illustrated case, while upper guide elements 70 are developed as projection-like sheet-metal parts 71. Lower guide elements 68 are situated at a lower end 78 of outer walls 53 and are welded thereto in the illustrated case, while upper guide elements 70 are developed at an upper end 80 of outer walls 53. Within the framework of the present invention, outer walls 53 may also be understood as sidewalls.

Structural elements 10 now include recesses 72 in each case, which are provided to accommodate lower guide elements 68. Recesses 72 are developed in the form of a groove 74. Located on the upper side of the wind box in turn are holding elements 76, which correspond to upper guide elements 70 and are provided to support outer walls 53 at upper end 80.

Outer walls 53 are installed in such a way that they are inserted along device structure 16 from the front towards the back. Lower guide elements 68 are introduced into corresponding recesses 72 of structural elements 10, and upper guide elements 70 are hooked in along holding elements 76. This allows for an easier installation of outer walls 53.

Figure 12:
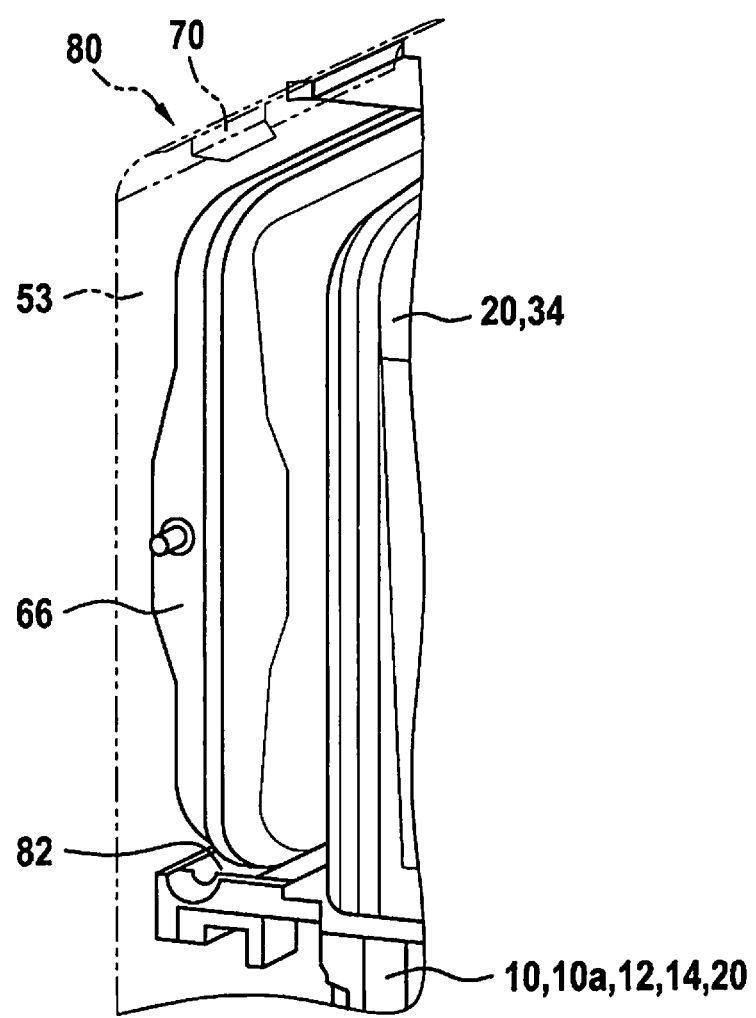
FIG. 12 shows a schematic representation of a part of the exemplary embodiment of the device structure from FIG. 10 with a closed wind box, a pressure-equalization vessel and an outer wall.

FIG. 12 shows a schematic representation of a part of the exemplary embodiment of device structure 16 from FIG. 11 together with a closed wind box 34, a pressure-equalization vessel 66, and an installed outer wall 53. It can also be seen in the figure that upper guide element 70 is hooked in at corresponding holding elements 76.

In addition, a pressure-equalization vessel 66, which is disposed on structural element 10a, can be gathered from FIGS. 11 and 12. Structural element 10a includes a receptacle 82 provided for said pressure-equalization vessel 66 and therefore allows for a stable placement of pressure-equalization vessel 66.

Figure 13:
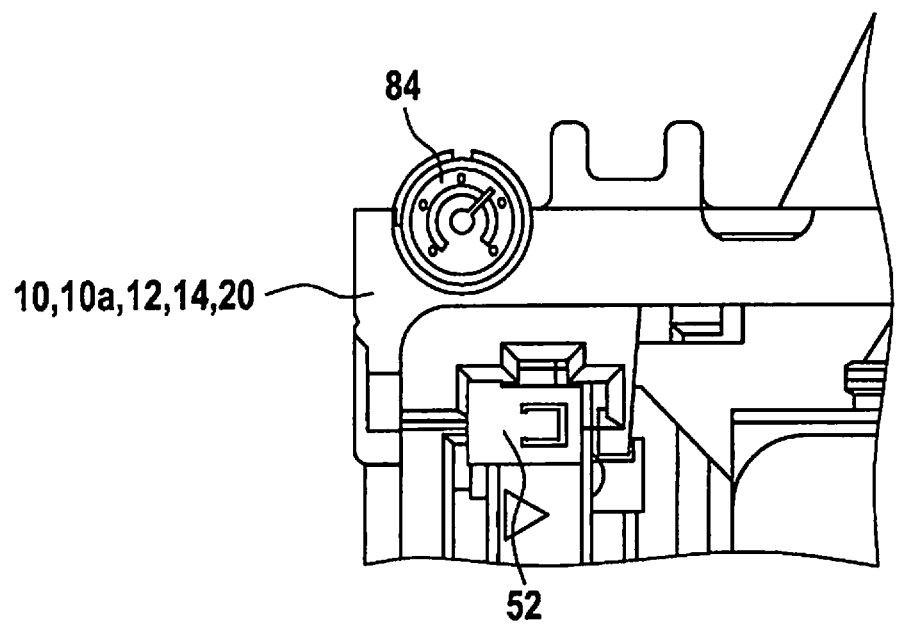
FIG. 13 shows a schematic representation of a part of the exemplary embodiment of a structural element from FIG. 8 together with a manometer.

FIG. 13 shows a schematic representation of a part of the exemplary embodiment of structural element 10a from FIG. 9 together with a manometer 84. It can be seen that structural element 10b has a receptacle 86 provided for manometer 84, so that an uncomplicated installation of manometer 84 on structural element 10a or housing structure 16 is possible.

In the illustrated exemplary embodiments, pressure-equalization vessel 66 and manometer 84 are functional units 24 that contribute to an operation of a heating device.

Figure 14:
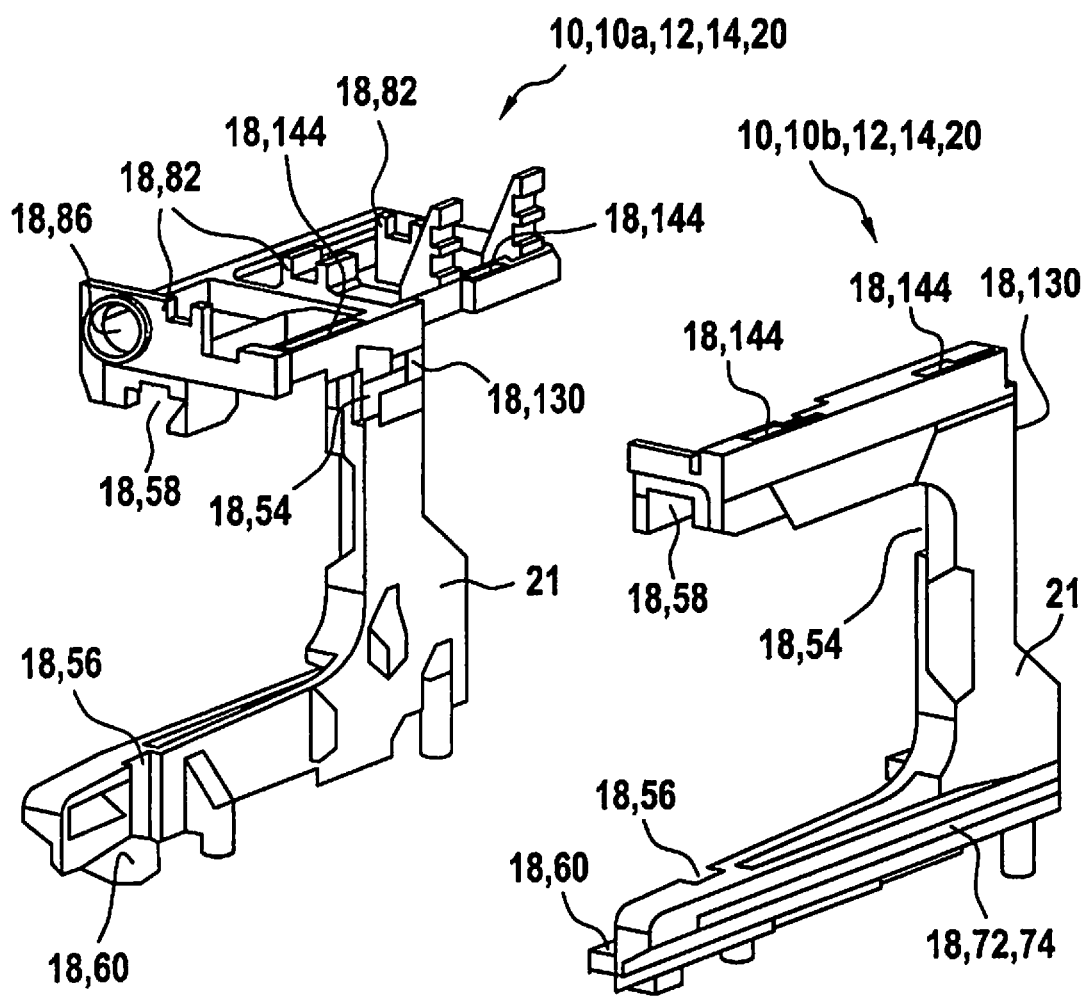
FIG. 14 shows a schematic representation of a further exemplary embodiment of two structural elements for a housing structure.

FIG. 14 shows a schematic representation of one further exemplary embodiment of two structural elements 10 for a housing structure 16. Structural elements 10 have essentially the same characteristics according to the present invention as structural elements 10 from FIG. 1.

Structural elements 10 are also at least essentially developed as casting foam parts 12; in the illustrated exemplary embodiment, they are completely developed as foam parts. In addition, in the illustrated case, structural elements 10 are developed as thermoplastic casting foam parts 14, which reduces the production costs.

Analogous to structural elements 10 shown in FIG. 1, structural elements 10 depicted in FIG. 13 also have a multitude of receptacles 18 for structural housing elements 20, for additional housing elements 22, and for functional units 24, which allows for a flexible expansion of structural elements 10. These are the same further housing elements 22 and functional units 24 as those already shown and described in connection with FIGS. 8 through 13. However, it is alternatively also possible to use other and/or additional further housing elements and functional units.

Figure 15:
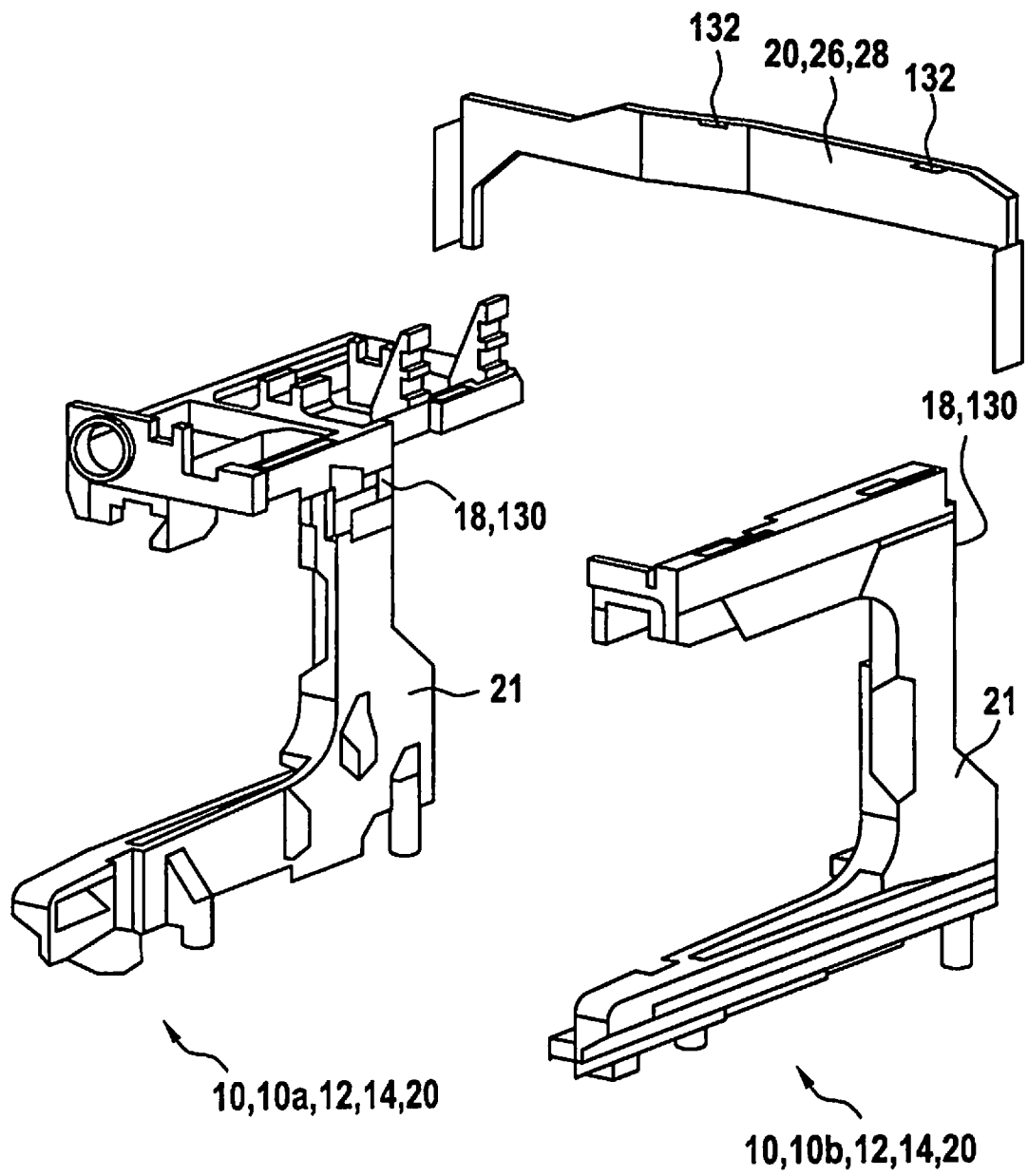
FIG. 15 shows a schematic representation of the further exemplary embodiment of the structural elements from FIG. 14 together with a connection element.
Figure 16:
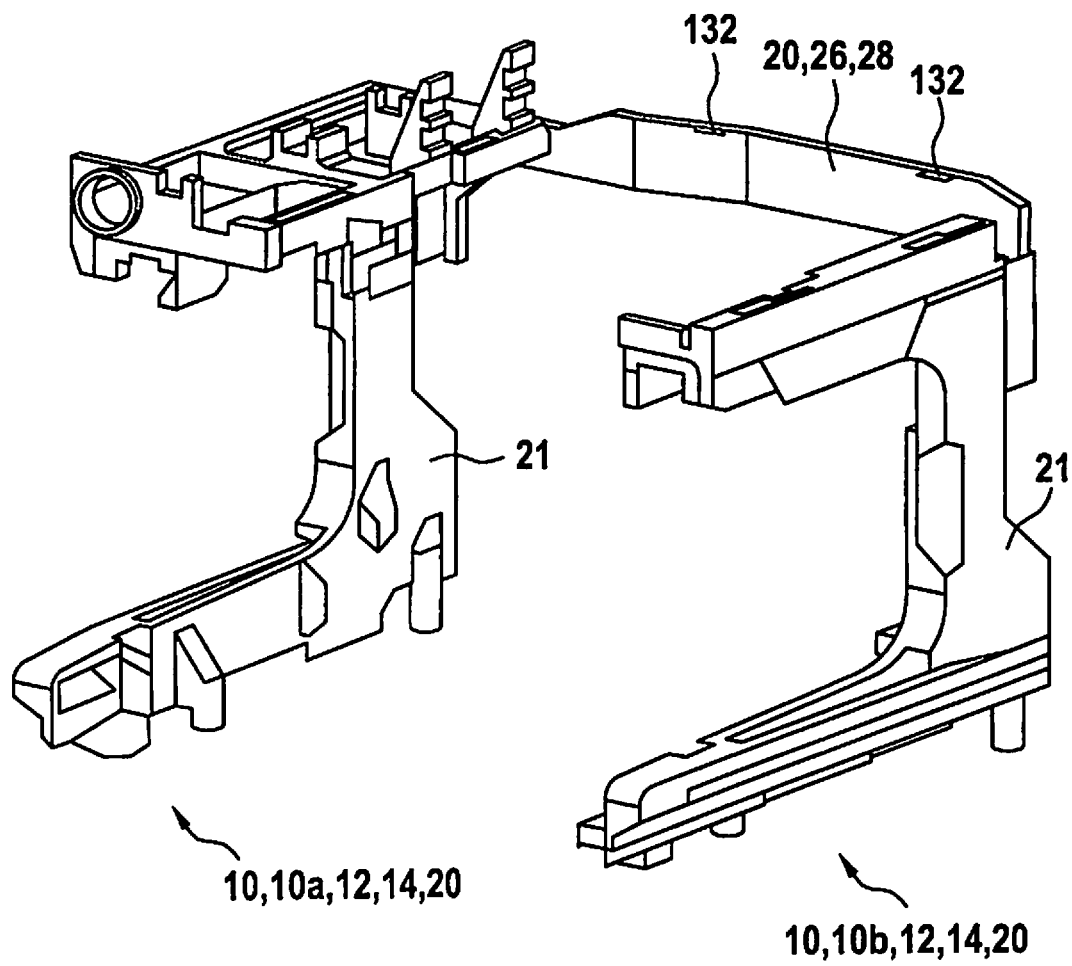
FIG. 16 shows another schematic representation of the further exemplary embodiment of the structural elements from FIG. 14 together with a connection element.
Figure 17:
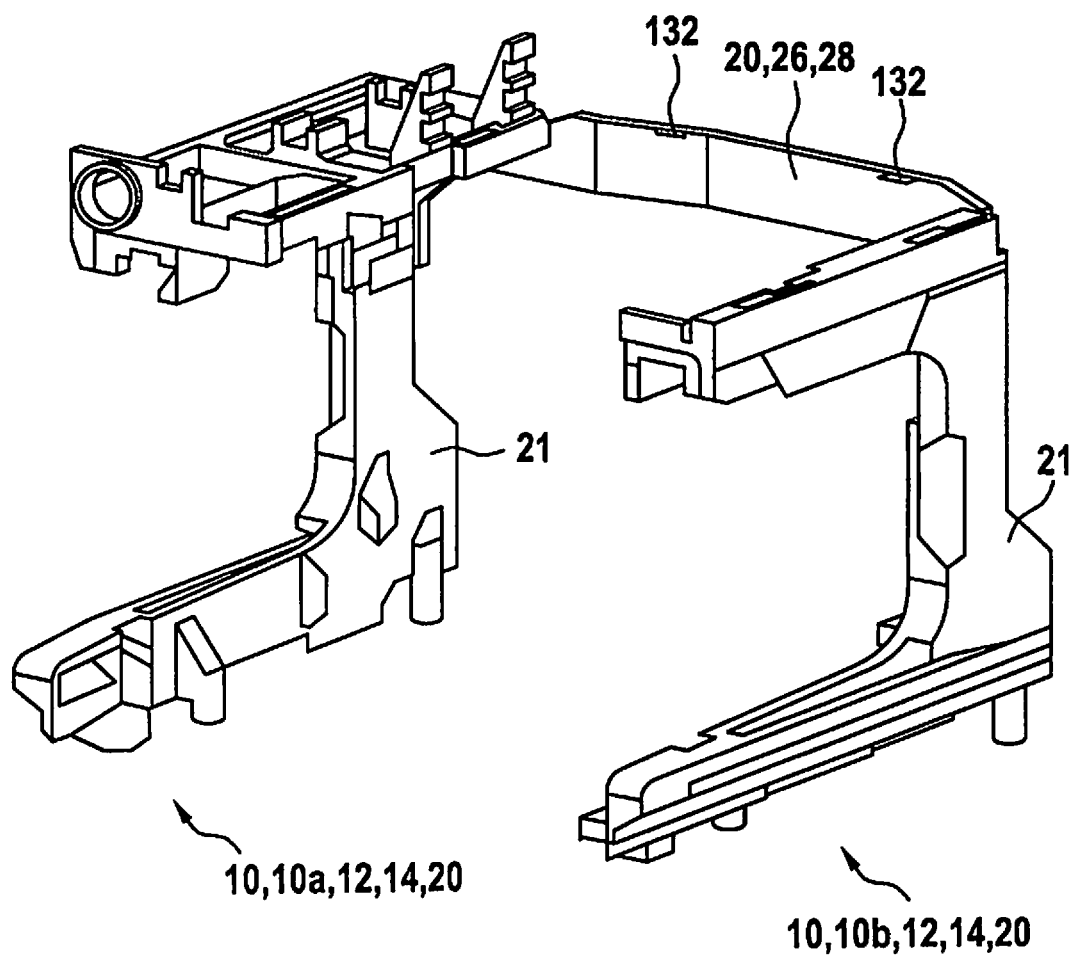
FIG. 17 shows another schematic representation of the further exemplary embodiment of the structural elements from FIG. 14 together with a connection element.

FIGS. 15 through 17 show schematic illustrations of the exemplary embodiment of structural elements 10 from FIG. 14 together with a connection element 26. The difference from the exemplary embodiment of structural elements 10 from FIG. 1, shown in FIGS. 2 through 4, is that connection element 26 is a sheet-metal element 128.

As can be gathered from FIGS. 15 through 17, connection element 26, or sheet-element 128, is introduced into recesses 130, which are provided for the accommodation of connection element 26 and are introduced into structural elements 10, i.e. on the rear side of structural elements 10 in the illustrated exemplary embodiment. This connects structural elements 10, i.e. structural element 10a and further structural element 10b, to each other and allows for an easier installation of connection element 26.

Sheet-metal part 128 has tab-like projections 132, which are provided to connect sheet-metal element 128 to a wind box 34. Both a rivet connection and a screw connection are conceivable in this context.

Figure 18:
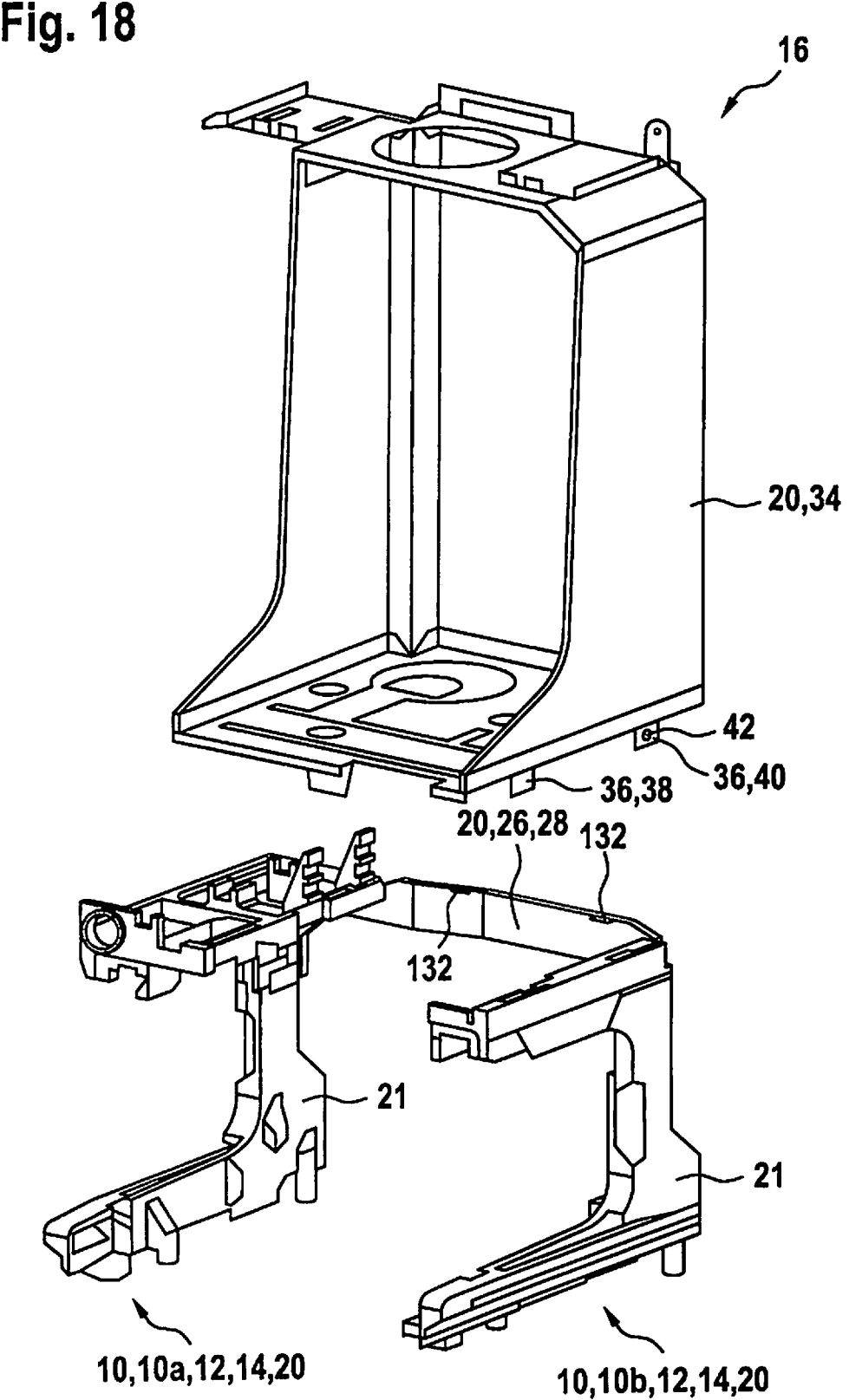
FIG. 18 shows a schematic representation of the further exemplary embodiment of the structural elements from FIG. 14 with a connection element and a wind box.
Figure 19:
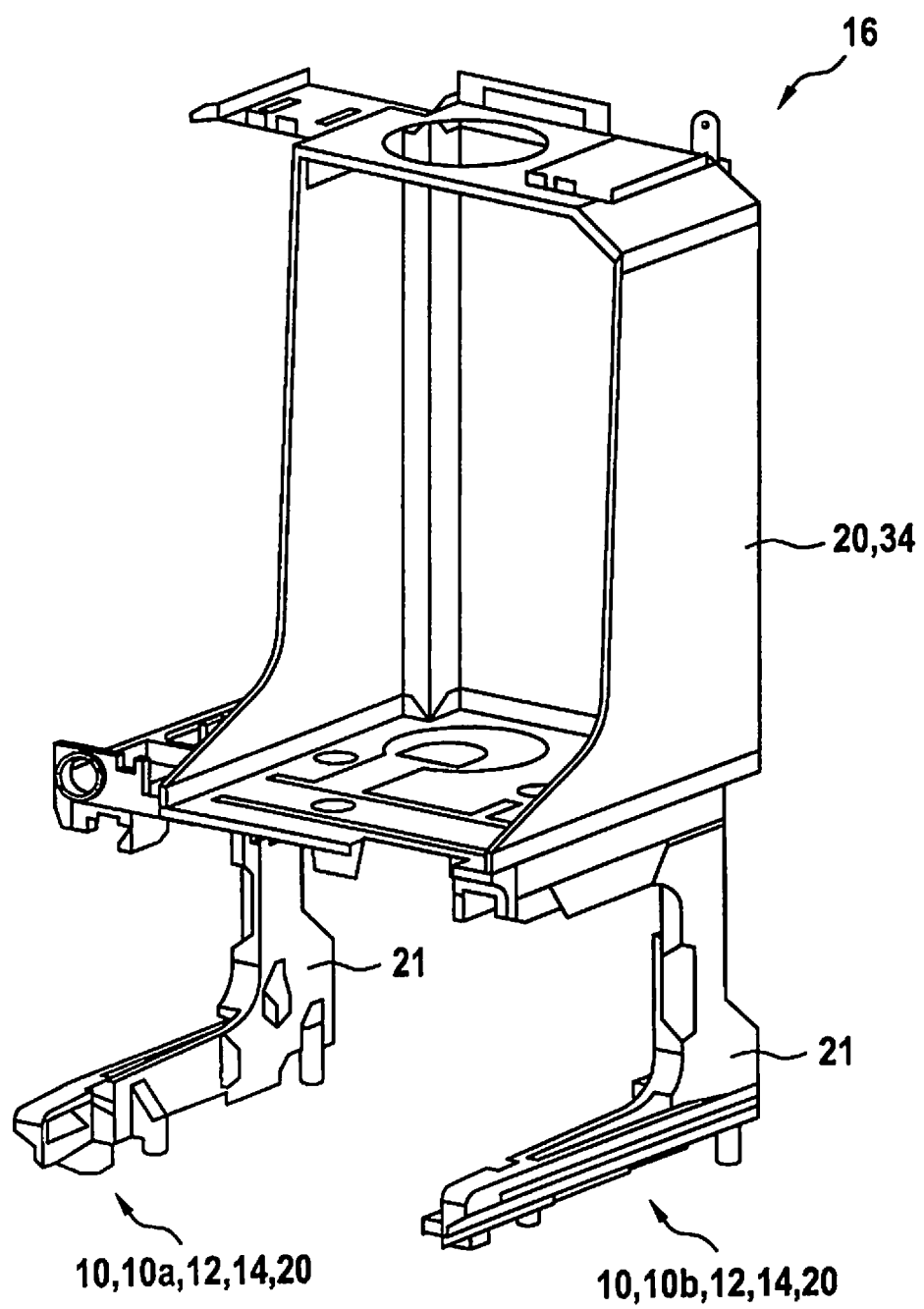
FIG. 19 shows another schematic representation of the further exemplary embodiment of the structural elements from FIG. 14 together with a connection element and a wind box.
Figure 20:
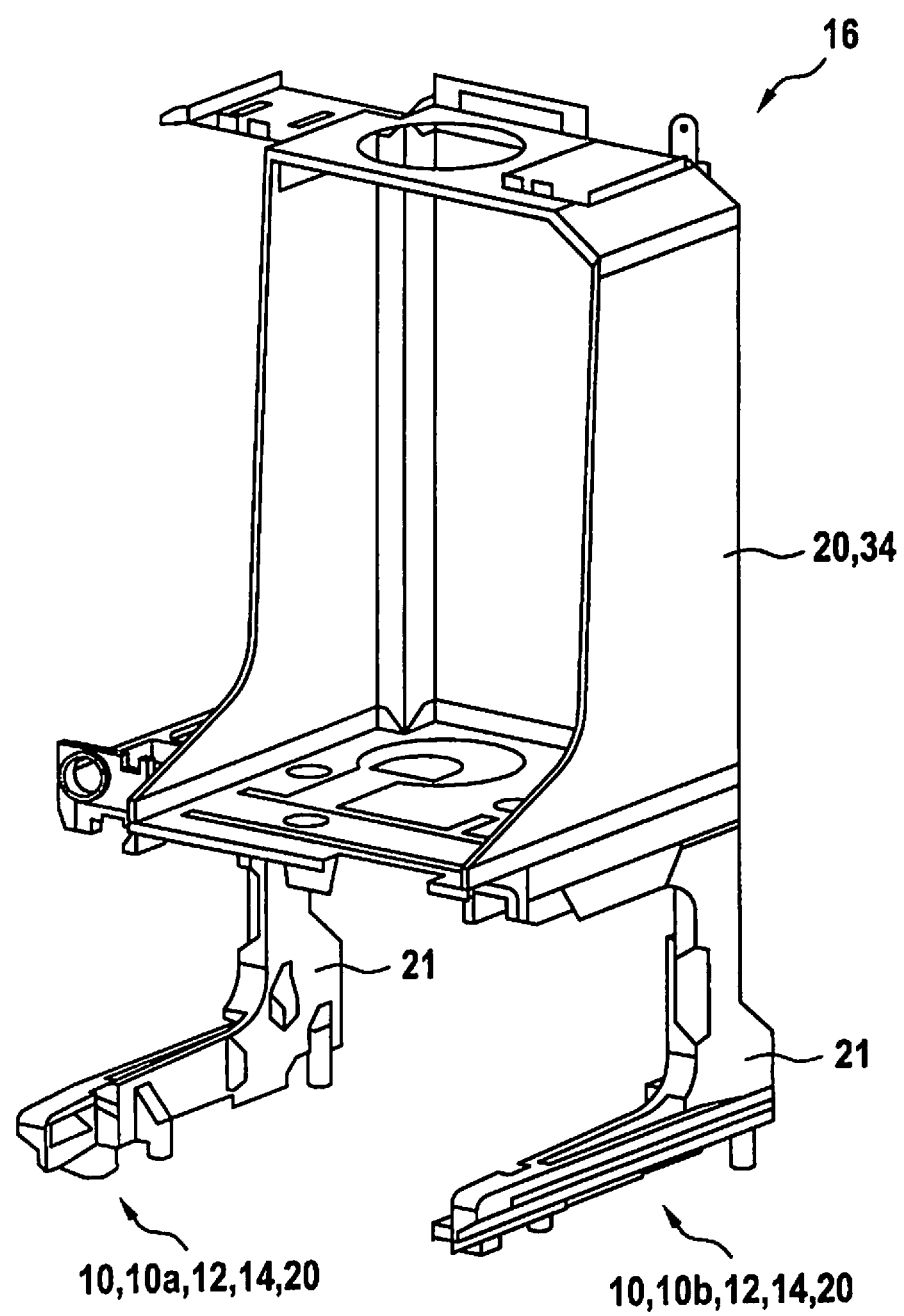
FIG. 20 shows another schematic representation of the further exemplary embodiment of the structural elements from FIG. 14 together with a connection element and a wind box.

Accordingly, a schematic representation of the exemplary embodiment of structural elements 10 from FIG. 14 together with a connection element 26 or a sheet-metal part 128, and a wind box 34 are shown in FIGS. 18 through 20. Similar to the exemplary embodiment from FIGS. 5 through 7, wind box 34 is also mounted on structural elements 10 in the exemplary embodiment according to FIGS. 18 through 20. The same wind box 34 as in the exemplary embodiment according to FIGS. 5 through 7 is involved in the exemplary embodiment according to FIGS. 18 through 20. However, as an alternative, it would also be possible to use some other wind box or one that has a similar design.

In the illustrated exemplary embodiment according to FIGS. 18 through 20 as well, tab-like connection means 38 of wind box 34 are inserted into corresponding receptacles 18, i.e. in the depicted case, into recesses 144 provided to accommodate tab-like connection means 38.

However, according to FIGS. 18 through 20, after tab-like connection means 36 of wind box 34 have been inserted into recesses 144 of structural element 10 provided to accommodate tab-like connection means 38, wind box 34 is secured in place with structural elements 10 through a lateral displacement, which involves a displacement toward the rear in the illustrated exemplary embodiment. Then, wind box 34 is retained at tab-like projections 132 of sheet-metal element 128, which prevents further shifting of wind box 34.

It would additionally also be possible, as already in the exemplary embodiment from FIGS. 5 and 6, to secure the rear, tab-like connection means 40 of wind box 34 in such a way that no further displacement is possible. The securing could also be realized with the aid of a detent element, e.g., a snap-in hook, which locks into place in hole 42 of rear, tab-like connection means 40 and additionally prevents shifting of wind box 34 toward the front. It would likewise be conceivable, for example, that the front tab-like connection means 38 has a hole 42, which is fixed in place with the aid of a detent mechanism.

Similar to FIGS. 1 through 7, FIGS. 14 through 20 represent a mounting sequence for mounting a housing structure 16 for a heating device. The method is mainly characterized in that the following method steps are carried out:

a) Inserting connection element 26, i.e. sheet-metal element 128 in the illustrated case, into structural elements 10 in order to connect structural elements 10 to each other;

b) Placing wind box 34 on top of structural elements 10.

This, too, allows for a particularly rapid and uncomplicated mounting.

What is claimed is:

1. A structural element for a housing structure of a heating device, wherein the structural element is a thermoplastic casting foam part, wherein the structural element has a C-shape that is open in a same direction as a front of the heating device, wherein the structural element has at least one receptacle for at least one of: (i) a structural housing element, (ii) at least one further housing element, and (iii) at least one functional unit, wherein the at least one structural housing element is at least one wind box, wherein the at least one wind box is mounted on the structural element via at least two tab-like connection means to establish a form-locked connection with the structural element.

2. The structural element as recited in claim 1, wherein the at least one receptacle is for the at least one housing element, wherein the at least one further housing element is at least one of: (i) at least one component for connecting a hydraulic unit, (ii) at least one device for accommodating a control element, (iii) at least one detent element, and (iv) at least one outer wall of an external housing.

3. The structural element as recited in claim 1, wherein the at least one receptacle is for the at least one functional unit, wherein the at least one functional unit is at least one of: (i) at least one manometer, and (ii) at least one pressure-equalization vessel.

4. A housing structure for a heating device, comprising:
at least two structural elements, wherein each of the at least two structural elements is a thermoplastic casting foam part, wherein each of the at least two structural elements has a C-shape that is open in a same direction as a front of the heating device,
wherein each of the at least two structural elements has at least one receptacle for at least one of: (i) a structural housing element, (ii) at least one further housing element, and (iii) at least one functional unit, wherein the at least one structural housing element is at least one wind box, wherein the at least one wind box is mounted on the structural element via at least two tab-like connection means to establish a form-locked connection with the structural element.

5. The housing structure as recited in claim 4, wherein the housing structure has at least one connection element provided to connect the at least two structural elements to each other, the at least one connection element including at least one of a pipe element and a sheet-metal element.

6. The housing structure as recited in claim 5, wherein the housing structure has at least one wind box, which is able to accommodate a heat cell.

7. The housing structure as recited in claim 6, wherein the housing structure is made up of the at least two structural elements, the at least one connection element, and the at least one wind box.

8. A gas heating system, comprising:
a housing structure for a heating device, the housing structure including at least two structural elements, wherein each of the at least two structural elements is a thermoplastic casting foam part, wherein each of the at least two structural elements has a C-shape that is open in a same direction as a front of the heating device,
wherein each of the at least two structural elements has at least one receptacle for at least one of: (i) a structural housing element, (ii) at least one further housing element, and (iii) at least one functional unit, wherein the at least one structural housing element is at least one wind box, wherein the at least one wind box is mounted on the structural element via at least two tab-like connection means to establish a form-locked connection with the structural element.

9. A method for mounting a housing structure for a heating device, the housing structure including at least two structural elements, wherein each of the at least two structural elements is a foam part, the method comprising:
inserting, at least one connection element into the at least two structural elements to connect the at least two structural elements to each other; and
attaching at least one wind box on the at least two structural elements via at least two tab-like connection means to establish a form-locked connection with the at least two structural elements, wherein the structural element has a C-shape that is open in a same direction as a front of the heating device.

* * * * *